(12) United States Patent
Jones

(10) Patent No.: US 6,203,026 B1
(45) Date of Patent: Mar. 20, 2001

(54) AIR SUSPENSION OVERRIDE SYSTEM

(76) Inventor: Marcus Jones, 7009 Stoney Creek Dr., Oklahoma City, OK (US) 73132

( * ) Notice: Subject to any disclaimer, the term of this patent is extended or adjusted under 35 U.S.C. 154(b) by 0 days.

(21) Appl. No.: 09/401,545

(22) Filed: Sep. 22, 1999

(51) Int. Cl.[7] .................................................. B60G 17/00
(52) U.S. Cl. .................................... 280/6.151; 280/6.159
(58) Field of Search ............................. 280/6.151, 6.152, 280/6.159, 6.157, 6.16, 6.15

(56) References Cited

U.S. PATENT DOCUMENTS

| | | | |
|---|---|---|---|
| 3,074,739 | 1/1963 | Alfieri | 280/6.15 |
| 3,214,185 | * 10/1965 | Mason et al. | 280/6.151 |
| 4,335,901 | 6/1982 | Gladish | 280/6.151 |

* cited by examiner

Primary Examiner—Peter C. English
(74) Attorney, Agent, or Firm—Dunlap, Codding & Rogers, P.C.

(57) ABSTRACT

An override system for use in combination with an automatic air suspension leveling system for a vehicle is provided The override system includes a cylinder having a piston and a piston rod associated therewith. The cylinder is mounted to the chassis so that the piston rod extends from the cylinder so as to be engageable with a control arm of the air suspension leveling system to move the control arm to an up position upon moving the piston rod from a retracted position to an extended position. The piston and the piston rod are actuated by a pressurized fluid source from the retracted position wherein the control arm is maintained in the neutral position to the extended position wherein the piston rod engages the control arm and causes the control arm to be pivoted to the up position so as to open the regulating valve to cause additional air to be introduced into the air spring thus resulting in the chassis being raised relative to the axle. A valve is interposed between the cylinder and the pressurized fluid source for selectively controlling the flow of pressurized fluid to the cylinder. A spring linkage assembly links the axle to the control arm so that the control arm can be independently moved relative to the axle yet sufficiently stiff to transmit force between the axle and the control arm.

13 Claims, 4 Drawing Sheets

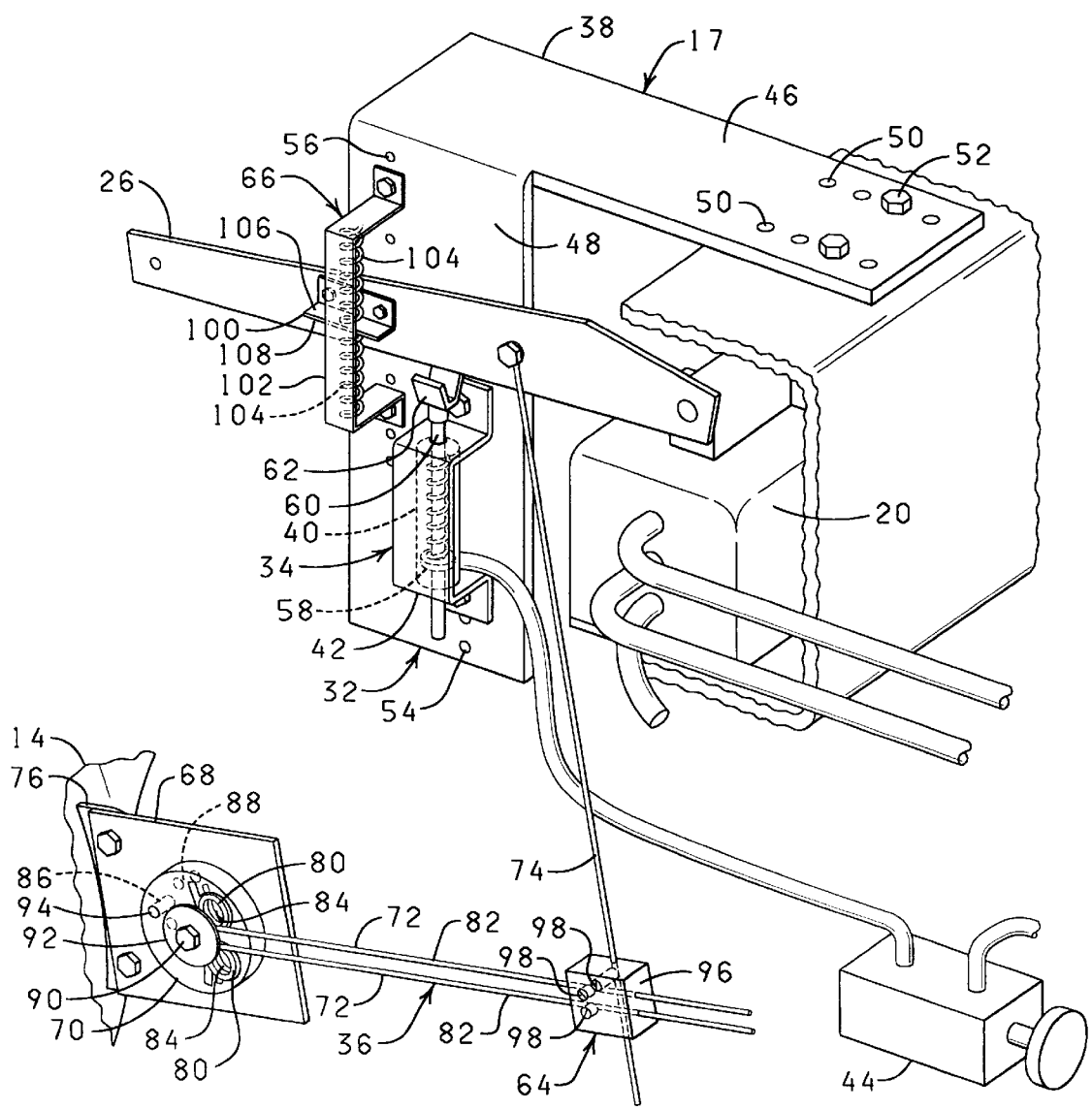

AIR SUSPENSION OVERRIDE SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to control systems for air suspensions, and more particularly, but not by way of limitation, to a control system for overriding a vehicle's automatic air suspension leveling system such that the height of a vehicle's chassis relative to the vehicle's axle can be selectively altered.

2. Brief Description of the Related Art

Air suspension systems for vehicles, particularly trucks and buses, are well known. Such suspension systems generally include one or more air springs or air bags at each end of each axle such that a sprung mass which includes the chassis, body, and load of the vehicle is supported on an unsprung mass which includes the wheels, suspension, and axle.

Larger vehicles equipped with air suspensions, such as trucks consisting of a tractor and trailer are often also equipped with automatic leveling systems to maintain the height of the chassis of the tractor relative to the ground independent of the load supported by the trailer and/or the height of the chassis of the trailer relative to the ground. Many leveling systems comprise a regulating valve mounted on the chassis of the tractor and/or trailer and a leveling arm having one end operably connected to the regulating valve and another end linked to the axle of the tractor and/or trailer by a rigid rod. Thus, when the axle and chassis move relative to one another, such as when a load is placed on the chassis, the link forces the leveling arm to pivot. More particularly, when the leveling arm pivots upwardly because the chassis and axle have moved toward one another, the leveling arm opens the regulating valve so as to cause additional air to be introduced into the air springs, thus resulting in the chassis being raised relative to the axle. In contrast, when the leveling arm pivots downwardly because the chassis and axle have moved away from one another, the leveling arm causes the regulating valve to release or bleed air from the air springs, thus causing the chassis to be lowered relative to the axle.

While the automatic leveling system functions to maintain the chassis at a predetermined level relative to the axle, it is desirable to be able to selectively alter the clearance height between the chassis and the axle, particularly during loading and unloading operations, whereby the chassis of a tractor may be easily raised or lowered to mate with a loaded trailer thereby eliminating the driver from having to manually crank the trailer up or down to match the height of the tractor.

To this end, the present invention is directed to an improved override control system for overriding a vehicle's automatic air suspension leveling system such that the height of a vehicle's chassis relative to the vehicle's axle can be selectively altered.

BRIEF SUMMARY OF THE INVENTION

The present invention is directed to an override system for use in combination with an automatic air suspension leveling system for a vehicle. The automatic air suspension leveling system includes a regulating valve mounted to a chassis of the vehicle for controlling air pressure in an air spring which is mounted between the chassis and an axle of the vehicle. The regulating valve is operated by a control arm which is rotatable between a neutral position, an up position, and a down position and which is connectable to the axle whereby the regulating valve is operated in response to movement of the chassis relative to the axle.

The override system includes a cylinder having a piston and a piston rod associated therewith. The cylinder is mounted to the chassis so that the piston rod extends from the cylinder so as to be engageable with the control arm to move the control arm to the up position upon moving the piston rod from a retracted position to an extended position. The piston and the piston rod are actuated by a pressurized fluid source from the retracted position wherein the control arm is maintained in the neutral position to the extended position wherein the piston rod engages the control arm and causes the control arm to be pivoted to the up position so as to open the regulating valve to cause additional air to be introduced into the air spring thus resulting in the chassis being raised relative to the axle. A valve is interposed between the cylinder and the pressurized fluid source for selectively controlling the flow of pressurized fluid to the cylinder. A spring linkage assembly links the axle to the control arm so that the control arm can be independently moved relative to the axle yet sufficiently stiff to transmit force between the axle and the control arm.

The objects, features and advantages of the present invention will become apparent from the following detailed description when read in conjunction with the accompanying drawings and appended claims.

BRIEF DESCRIPTION OF THE SEVERAL VIEWS OF THE DRAWING

FIG. 3 is an enlarged view of the override control system of the present invention.

DETAILED DESCRIPTION OF THE INVENTION

Figure 1:
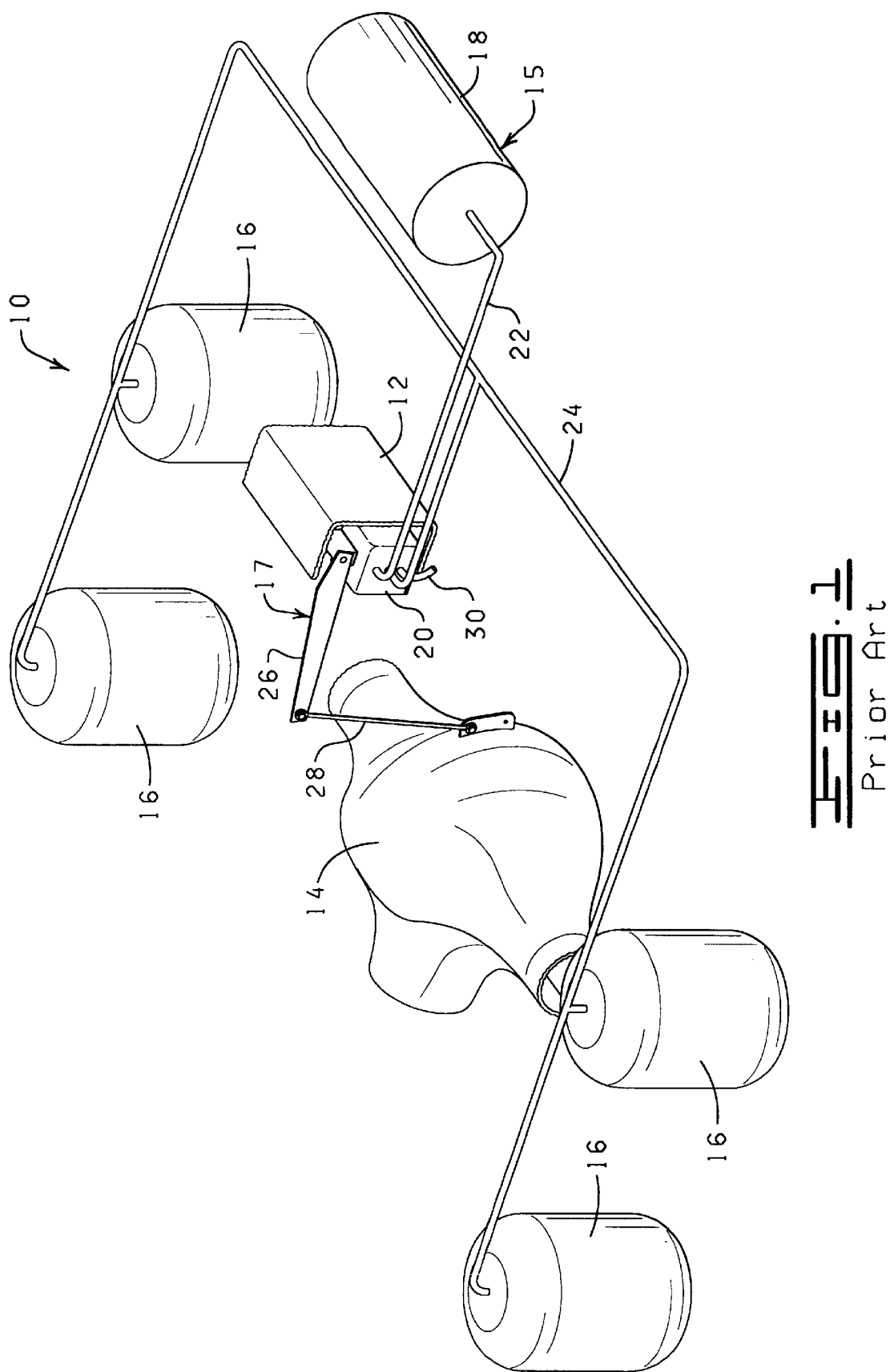
FIG. 1 is a schematic illustration of a prior art automatic leveling system for a vehicle utilizing an air spring suspension.

Referring now to the drawings, and more particularly to FIG. 1, a vehicle 10 is schematically illustrated. The vehicle 10 includes a chassis 12 and an axle 14. The vehicle 10 has an air suspension system 15 which employs a plurality of air springs or air bags 16 to support the chassis 12 on the axle 14 in a manner well known in the art.

The air suspension system 15 is shown in FIG. 1 to include a leveling system 17 which is also well known. The leveling system 17 has an air reservoir 18 which is supplied by an engine driven compressor (not shown). The air reservoir 18 is connected to a regulating valve 20 via a conduit 22. The regulating valve 20 is in turn connected to each of the air springs 16 via a conduit 24. The regulating valve 20 functions to feed compressed air to, or to bleed compressed air from, the air springs 16 to maintain a clearance height between the chassis 12 and the axle 14 and thus to maintain the chassis 12 generally parallel to the axle 14. This is accomplished by providing the regulating valve 20 with a control arm 26 which is pivotally connected to the regulating valve 20 at one end thereof. The other end of the control arm 26 is connected to the axle 14 with a rigid rod 28.

The control arm 26 is pivotable between a neutral position (FIG. 1), an up position, and a down position. In the neutral position of the control arm 26, the regulating valve 20 is closed to maintain the air pressure in the air springs 16. When the control arm 26 is pivoted to the up position, the regulating valve 20 opens thereby allowing compressed air to be introduced into the air springs 16 which results in the chassis 12 being raised relative to the axle 14. Finally, when the control arm 20 is pivoted to the down position, the regulating valve 20 bleeds air from the air springs 16 via an exhaust tube 30, thus causing the chassis 12 to be lowered relative to the axle 14.

As mentioned above, the above described leveling system 17 is used primarily on large trucks for maintaining the chassis level with uneven loads. However, it is often desirable to selectively alter the height of the chassis, particularly when hooking and unhooking the tractor to the trailer.

Figure 2:
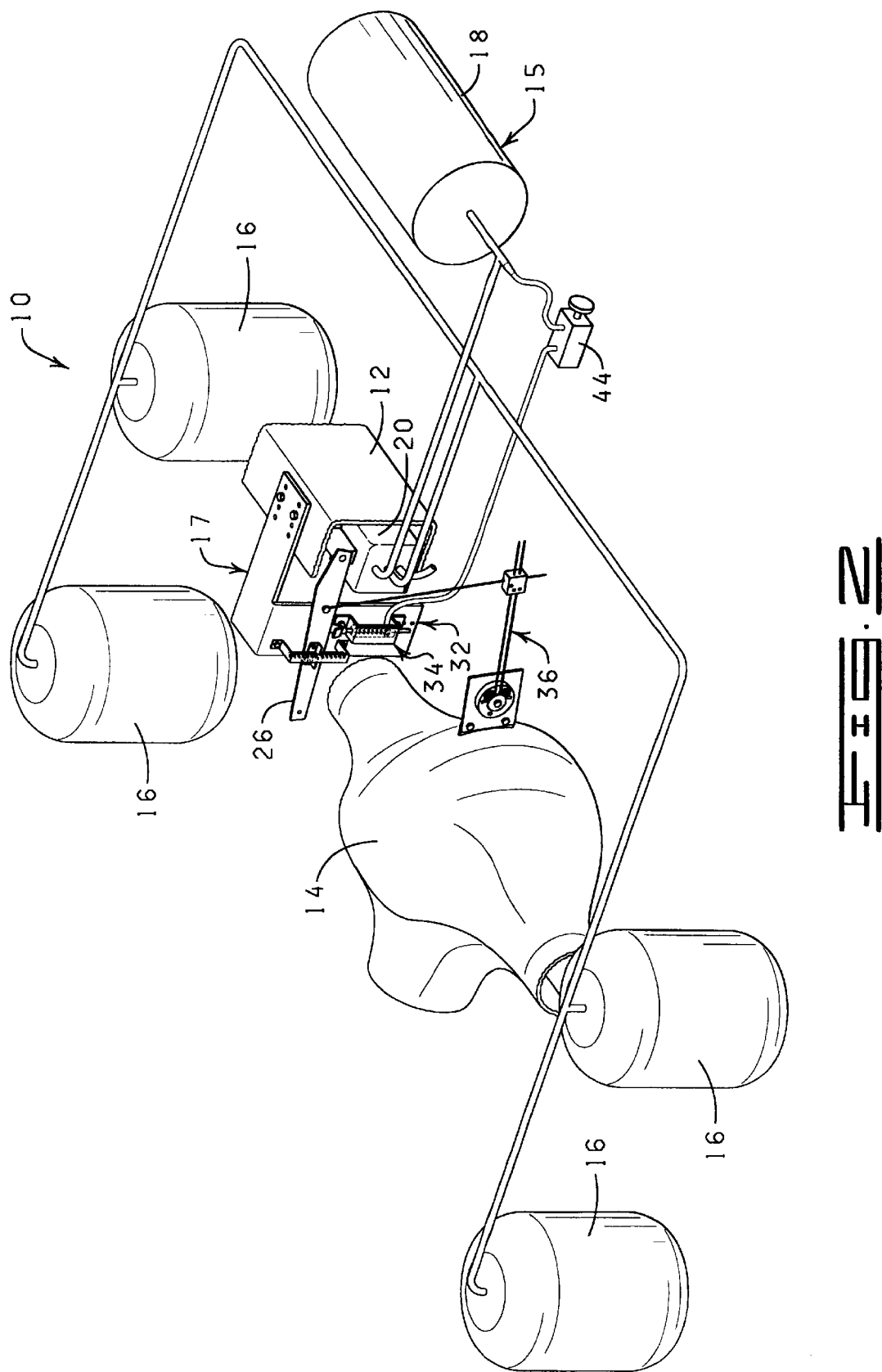
FIG. 2 is a schematic illustration of the automatic leveling system of FIG. 1 shown with an override control system constructed in accordance with the present invention incorporated therein.

Referring now to FIG. 2, the leveling system 17 is shown having been modified to include an air suspension override system 32 constructed in accordance with the present invention for overriding the leveling system 17 such that the height of chassis 12 relative to the axle 14 can be selectively altered. Broadly, the air suspension override system 32 includes a control arm actuating assembly 34 and a spring linkage assembly 36.

FIG. 3 is an enlarged view of the override system 32. The control arm actuating assembly 34 functions to selectively engage the control arm 26 to move the control arm 26 to the up position wherein the regulating valve 20 is open thereby allowing compressed air to be introduced into the air springs 16 from the air reservoir 18. The control arm actuating assembly 34 is mounted to the chassis 12 of the vehicle 10. As such, the spring linkage assembly 36 links the control arm 26 with the axle 14 so as to permit the control arm 26 to move independently relative to the axle 14 while at the same time being sufficiently stiff to transmit force between the axle 14 and the control arm 26 when the air suspension override system 32 is not in use whereby the leveling system 17 functions in its normal manner.

The control arm actuating assembly 34 includes a chassis extension member 38, a cylinder 40 which is connected to the chassis extension member 38 with a mounting bracket 42, and a control valve 44. The chassis extension member 38 is illustrated as being a substantially L-shaped member having a first surface 46 and a second surface 48 which extends normal to the first surface 46. The chassis extension member 38 functions to link the cylinder 40 to the chassis 12 and to support the cylinder 40 so that the cylinder 40 is selectively engageable with the control arm 26 to move the control arm 26 to the up position. Thus, it will be appreciated that the chassis extension member 38 is not limited to the configuration shown herein, but can be any structural device capable of tying the cylinder 40 to the chassis 12 while supporting the cylinder so that the cylinder 40 is capable of selectively engaging and moving the control arm 26 to the up position.

The chassis extension member 38 includes a plurality of holes 50 extending through the first surface 46 for connecting the chassis extension member 38 to the chassis 12 with a connecting member, such as a nut and bolt assembly 52. The various sets of holes 50 shown permit the position of the chassis extension member 38 to be selectively adjusted relative to the control arm 26.

The second surface 48 of the chassis extension member 38 extends in a substantially parallel relationship to the control arm 26. The second surface 48 of the chassis extension member 38 includes a set of holes 54 for mounting the mounting bracket 42 to the chassis extension member 38 and a set of holes 56 for mounting a portion of the spring linkage assembly 36 to the chassis extension member 38 in a manner to be described below. Alternatively, the holes 54 and the holes 56 could be replaced with a plurality of slots to facilitate adjustment.

The cylinder 40 is illustrated as being a single acting pneumatic cylinder with a piston 58 and a piston rod 60 associated therewith. The cylinder 40 is mounted to the second surface 48 of the chassis extension member 38 with the mounting bracket 42 such that the piston rod 60 is positioned below the control arm 26. More specifically, the piston rod 60 includes a cradle 62 configured to capture and engage the control arm 26 upon actuation of the cylinder 40. The mounting bracket 42 is connected to the second surface 48 of the chassis extension member 38 via one of the sets of holes 54 in the second surface 48 of the chassis extension member 38 so that the cradle 62 is spaced a distance from the lower side of the control arm 26 when the cylinder 40 is in a retracted position and the control arm 26 is in the neutral position. This spacing allows the control arm 26 to move between the neutral position, the up position, and the down position during normal operation of the leveling system 17. The cylinder 40 may be positioned anywhere along the length of the control arm 26. However, it may be preferable to position the cylinder 40 along a medial portion of the control arm 26 rather than the distal end of the control arm 26 to reduce the length of stroke required for the cylinder 40.

The control valve 44 is interposed between the cylinder 40 and the air reservoir 18 for selectively controlling the flow of compressed air to the cylinder 40. The control valve 44 can be positioned in any convenient location on the vehicle 10, such as on one side of the vehicle 10 so that the driver or operator can view the height of the chassis 12 relative to a trailer, for example, while the driver is overriding the leveling system 17.

The spring linkage assembly 36 includes a control arm linkage subassembly 64 and a control support subassembly 66. The control arm linkage subassembly 64 includes a base plate 68, a spring retaining member 70, a pair of horizontal spring members 72, and a vertical arm member 74. The base plate 68 is mounted to a bracket 76 of the axle 14. The spring retaining member 70 is adapted to hold one end of the horizontal spring members 72 and provide for adjustment of the tension of the combination of the horizontal spring members 72 and the vertical arm member 74. More specifically, each of the horizontal spring members 72 includes a coil portion 80 and an arm portion 82. The spring retaining member 70 is provided with a pair of coil receiving recesses 84 and a hole 86 which is alignable with one of several holes 88 provided through the base plate 68.

The coil portions 80 of the horizontal spring members 72 are disposed in the coil receiving recesses 84 of the spring retaining member 70 such that the arm portions 82 of the horizontal spring members 72 extend away from the spring retaining member 70 in a substantially parallel relationship to one another. The spring retaining member 70 is rotatably connected to the base plate 68 with a screw 90, and the coil portions 80 of the horizontal spring members 72 are held in the coil receiving recesses 84 by a plate member 92. The spring retaining member 70 is secured in position relative to the base plate 68 with a screw 94 which is disposed through the hole 86 of the spring retaining member 70 and one of the holes 88 of the base plate 68.

The arm portions 82 of the horizontal spring members 72 are linked to the control arm 26 with the vertical arm member 74. The vertical arm member 74 has one end pivotally connected to the control arm 26 and the opposing end connected to the horizontal spring members 72 with a connecting member 96. The connecting member 96 is illustrated as being a block structure adapted to slidably receive the arm portions 82 of the horizontal spring members 72 and to slidably receive the vertical arm member 74 such that the vertical arm member 74 is disposed substantially normal to the horizontal spring members 72. The horizontal spring members 72 and the vertical arm member 74 are fixed relative to one another with corresponding set screws 98.

The horizontal spring members 72 and the vertical arm member 74 can be constructed from any suitable material, but a preferable material is a spring wire of a suitable gauge so that the combination of the horizontal spring members 72 and the vertical arm member 74 is able to flex when the control arm actuating assembly 34 acts on the control arm 26, yet the combination of the horizontal spring members 72 and the vertical arm member 74 is sufficiently stiff to transmit force between the axle 14 and the control arm 26 when the leveling system 17 is being operated in its normal manner. To reduce the amount of flexibility or play required in the control arm linkage subassembly 64, the vertical arm member 74 is connected to the control arm 26 a distance from the distal end of the control arm 26.

The control support subassembly 66 cooperates with the control arm linkage subassembly 64 in supporting the control arm 26. The control support subassembly 66 includes a spring support plate 100, a spring mounting bracket 102 and a pair of springs 104. The spring support plate 100 is connected to the control arm 26 so that the support plate 100 extends outwardly from the control arm 26 to provide a pair of opposing spring engaging surfaces 106 and 108. The spring mounting bracket 102 is adapted to be connected to the second surface 48 of the chassis extension member 38 via the set of holes 56 and to straddle the spring support plate 100 and the control arm 26. The springs 104 are connected to the spring mounting bracket 102 in a linear relationship to one another whereby the spring support plate 100 is positionable between the springs 104 with the ends of the springs 104 engageable with the spring engaging surfaces 106 and 108, respectively. In this manner, the control support subassembly 66 functions to bias the control arm 26 in the neutral position, yet allow the control arm 26 to move to the up position and the down position.

Figure 4:
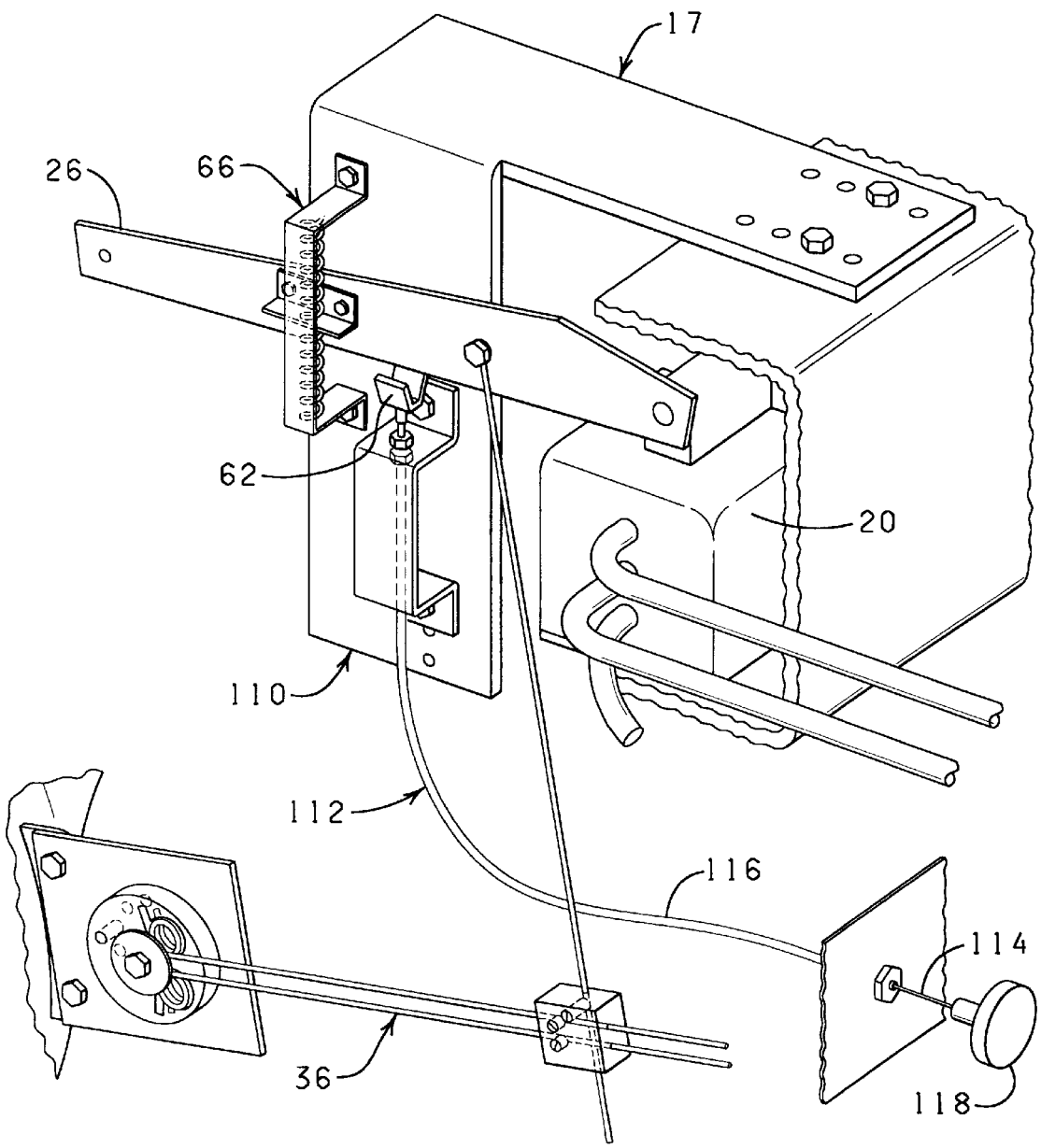
FIG. 4 is an enlarged view of another embodiment of an override control system constructed in accordance with the present invention.

It should be noted that while the cylinder 40 is preferably pneumatically actuated, other types of actuation, including mechanical, hydraulic, and electrical can be employed. For example, FIG. 4 illustrates an air suspension override system 110 which is identical to the air suspension override system 32 described above with the exception that the cylinder 40 and the control valve 44 of the air suspension override system 32 have been replaced with a cable assembly 112. The cable assembly 112 includes a spring loaded cable 114 and a cable cover 116. One end of the cable 114 is connected to the cradle 62 while the opposing end the cable 114 is provided with a knob 118. The knob end of the cable 114 is mounted in a convenient location where the driver can operate the knob 118 while readily observing the relative elevations of the chassis 12 and the trailer or loading dock.

In use, the operator pushes the knob 118 inwardly thereby causing the cradle 62 to engage the control arm 26 and in turn pivot the control arm 26 to the up position.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An override system in combination with an automatic air suspension leveling system for a vehicle, the automatic air suspension leveling system including a regulating valve mounted to a chassis of the vehicle for controlling air pressure in an air spring which is mounted between the chassis and an axle of the vehicle, the regulating valve operated by a control arm which is rotatable between a neutral position, an up position, and a down position and which is connectable to the axle whereby the regulating valve is operated in response to movement of the chassis relative to the axle, the override system comprising:

means mounted to the chassis of the vehicle for selectively pivoting the control arm to open the regulating valve so as to cause additional air to be introduced into the air spring, thus resulting in the chassis being raised relative to the axle; and a spring linkage assembly having one end connected to the axle of the vehicle and another end connected to the control arm, the spring linkage assembly being constructed such that the control arm can be independently moved relative to the axle yet the linkage is sufficiently stiff to transmit force between the axle and the control arm.

2. The combination of claim 1 wherein the means for pivoting the control arm comprises:

a cylinder having a piston and a piston rod associated therewith, the cylinder connected to the chassis and the piston rod extending from the cylinder so as to be engageable with the control arm to move the control arm to the up position upon moving the piston rod from a retracted position to an extended position;

pressurized fluid means for actuating the piston and the piston rod from the retracted position to the extended position; and a valve interposed between the cylinder and the pressurized fluid means for selectively controlling the flow of the pressurized fluid means to the cylinder.

3. The combination of claim 2 wherein the piston rod is spaced a distance from the control arm when the piston rod is in the retracted position.

4. The combination of claim 1 wherein the means for pivoting the control arm comprises:

a cable having a first end connected to a cradle and a second end, the cradle positioned relative to the control arm to engage and move the control arm to the up position upon actuating the cable from the second end thereof.

5. The combination of claim 1 wherein the spring linkage assembly comprises:

at least one horizontal spring member extending from the axle; and a vertical arm member having one end connected to the horizontal spring member and another end connected to the control arm.

6. The combination of claim 5 wherein the spring linkage assembly further comprises:
   means for biasing the control arm in the neutral position.

7. An override system in combination with an automatic air suspension leveling system for a vehicle, the automatic air suspension leveling system including a regulating valve mounted to a chassis of the vehicle for controlling air pressure in an air spring which is mounted between the chassis and an axle of the vehicle, the regulating valve operated by a control arm which is rotatable between a neutral position, an up position, and a down position and which is connectable to the axle whereby the regulating valve is operated in response to movement of the chassis relative to the axle, the override system comprising:
   a cylinder having a piston and a piston rod associated therewith, the cylinder connected to the chassis and the piston rod extending from the cylinder so as to be engageable with the control arm to move the control arm to the up position upon moving the piston rod from a retracted position to an extended position;
   a spring linkage assembly having one end connected to the axle of the vehicle and another end connected to the control arm, the linkage being constructed so that the control arm can be independently moved relative to the axle yet sufficiently stiff to transmit force between the axle and the control arm;
   pressurized fluid means for actuating the piston and the piston rod from the retracted position wherein the control arm is maintained in the neutral position to the extended position wherein the piston rod engages the control arm and causes the control arm to be pivoted to the up position so as to open the regulating valve to cause additional air to be introduced into the air spring thus resulting in the chassis being raised relative to the axle; and
   a valve interposed between the cylinder and the pressurized fluid means for selectively controlling the flow of the pressurized fluid means to the cylinder.

8. The combination of claim 7 wherein the piston rod is spaced a distance from the control arm when the piston rod is in the retracted position.

9. The combination of claim 7 wherein the spring linkage assembly comprises:
   at least one horizontal spring member extending from the axle; and
   a vertical arm member having one end connected to the horizontal spring member and another end connected to the control arm.

10. The combination of claim 9 wherein the spring linkage assembly further comprises:
    means for biasing the control arm in the neutral position.

11. An override system in combination with an automatic air suspension leveling system for a vehicle, the automatic air suspension leveling system including a regulating valve mounted to a chassis of the vehicle for controlling air pressure in an air spring which is mounted between the chassis and an axle of the vehicle, the regulating valve operated by a control arm which is rotatable between a neutral position, an up position, and a down position and which is connectable to the axle whereby the regulating valve is operated in response to movement of the chassis relative to the axle, the override system comprising:
    a cylinder having a piston and a piston rod associated therewith, the cylinder connected to the chassis and the piston rod extending from the cylinder so as to be engageable with the control arm to move the control arm to the up position upon moving the piston rod from a retracted position to an extended position, the piston rod being spaced a distance from the control arm when the piston rod is in the retracted position;
    a spring linkage assembly having one end connected to the axle of the vehicle and another end connected to the control arm, the linkage being constructed so that the control arm can be independently moved relative to the axle yet sufficiently stiff to transmit force between the axle and the control arm;
    pressurized fluid means for actuating the piston and the piston rod from the retracted position wherein the control arm is maintained in the neutral position to the extended position wherein the piston rod engages the control arm and causes the control arm to be pivoted to the up position so as to open the regulating valve to cause additional air to be introduced into the air spring thus resulting in the chassis being raised relative to the axle; and
    a valve interposed between the cylinder and the pressurized fluid means for selectively controlling the flow of the pressurized fluid means to the cylinder.

12. The combination of claim 11 wherein the spring linkage assembly comprises:
    at least one horizontal spring member extending from the axle; and
    a vertical arm member having one end connected to the horizontal spring member and another end connected to the control arm.

13. The combination of claim 12 wherein the spring linkage assembly further comprises:
    means for biasing the control arm in the neutral position.

* * * * *